US011254265B2

(12) United States Patent
Miller et al.

(10) Patent No.: US 11,254,265 B2
(45) Date of Patent: Feb. 22, 2022

(54) FOLDING STAIRCASE

(71) Applicants: Richard Miller, Elnora, IN (US);
Shannon Miller, Elnora, IN (US)

(72) Inventors: Richard Miller, Elnora, IN (US);
Shannon Miller, Elnora, IN (US)

(*) Notice: Subject to any disclaimer, the term of this patent is extended or adjusted under 35 U.S.C. 154(b) by 87 days.

(21) Appl. No.: 16/673,210

(22) Filed: Nov. 4, 2019

(65) Prior Publication Data
US 2020/0062184 A1 Feb. 27, 2020

Related U.S. Application Data

(60) Provisional application No. 62/874,583, filed on Jul. 16, 2019.

(51) Int. Cl.
B60R 3/02 (2006.01)
(52) U.S. Cl.
CPC ..................... B60R 3/02 (2013.01)
(58) Field of Classification Search
CPC ................ B60R 3/02; B60R 3/002
See application file for complete search history.

(56) References Cited

U.S. PATENT DOCUMENTS

| 3,955,827 | A | 5/1976 | Wonigar |
| 5,538,265 | A | 7/1996 | Chen et al. |
| 6,264,222 | B1 | 7/2001 | Johnston et al. |
| 7,971,891 | B2 * | 7/2011 | Kircher .................. A61G 3/061 280/163 |
| 8,042,820 | B1 | 10/2011 | Dewees |
| 9,834,147 | B2 * | 12/2017 | Smith ...................... G05D 3/10 |
| 2011/0226558 | A1 | 9/2011 | Fravel et al. |
| 2016/0101738 | A1 * | 4/2016 | Iotti .......................... E06C 5/06 182/207 |

* cited by examiner

Primary Examiner — Bryan A Evans
(74) Attorney, Agent, or Firm — Boudwin Intellectual Property; Daniel Boudwin

(57) ABSTRACT

A folding staircase. The folding staircase has a frame with an upper end and a lower end. The upper end of the frame defines a top step. Multiple steps are pivotally connected to the lower end of the frame and pivoting arms connects each of the steps to one another. The frame includes brackets that secure to existing mounting points of a vehicle. At least one step is operably connected to a linear actuator, which is in turn connected to a motor. The motor is operably connected to a control switch. Activation and deactivation of the control switch causes the motor to operate resulting in the unfolding of the steps outwardly to a deployed configuration and folding inwardly to a storage configuration. The folding staircase is utilized to provide a safe method of entering and exiting a vehicle.

15 Claims, 3 Drawing Sheets

FOLDING STAIRCASE

CROSS REFERENCE TO RELATED APPLICATIONS

This application claims the benefit of U.S. Provisional Application No. 62/874,583 filed on Jul. 16, 2019. The above identified patent application is herein incorporated by reference in its entirety to provide continuity of disclosure.

BACKGROUND OF THE INVENTION

The present invention relates to steps and stairs for vehicles. More particularly, the present invention provides for a motorized folding staircase for a vehicle that folds into a storage configuration against the vehicle and unfolds into a deployed configuration which a user utilizes to safely enter and exit the vehicle.

Semi-tractors and other similar vehicles normally include operator cabins that are elevated at a substantial height above the ground. These cabins are typically accessed via a vertical two-step ladder that is situated on the driver's side of the vehicle cabin beneath the entry door. These two-step ladders typically have steep inclines and the steps are typically spaced far apart. While such ladders facilitate the climb into and out of the cabin, it can be awkward and potentially dangerous for operators to enter and exit the vehicle cabin using them. The steep incline of the steps makes it all too easy for an individual to accidentally fall while climbing into or out of the vehicle cabin which can cause injury to themselves or others.

Devices have been disclosed in the known art that relate to steps and stairs for vehicles. These include devices that have been patented and disclosed in patent application publications. However, the devices in the known art have several drawbacks. Some vehicles have dedicated entry stairs that provide a more gradual incline and are easier to use to enter the vehicle cabin. However, these types of entry stairs can be bulky and can be a hazard due to the increased space they occupy. Other vehicles have integrated panels that fold down to form steps. However, these types of steps must be integrated into the design of the vehicle's bumper and cab structure, and only provide a steep two-step configuration. In order to address these concerns, it is desirable to provide a folding staircase comprised of steps that provide a more gradual incline and safer means for entering a vehicle, whereby the steps are able to fold against the vehicle in a stored position.

The present invention substantially diverges in design elements from the known art and consequently it is clear that there is a need in the art for an improvement to existing steps and stairs for vehicles. In this regard the present invention substantially fulfills these needs.

SUMMARY OF THE INVENTION

In view of the foregoing disadvantages inherent in the known types of steps and stairs for vehicles now present in the prior art, the present invention provides a folding staircase comprising steps that provide a more gradual incline and safer means for entering a vehicle, whereby the steps are able to fold against the vehicle in a stored position. The present folding staircase comprises a frame with an upper end and a lower end. The upper end of the frame defines a top step. A plurality of steps is pivotally connected to the lower end of the frame. A plurality of pivoting arms connects each of the plurality of steps to one another. The frame includes brackets that secure to existing mounting points of a vehicle. At least one step of the plurality of steps is operably connected to a linear actuator, which is in turn connected to a motor. The motor is operably connected to a control switch. Activation and deactivation of the control switch causes the motor to operate resulting in the plurality of steps unfolding outwardly to a deployed configuration and folding inwardly to a storage configuration. The folding staircase is utilized to provide a safe method of entering and exiting a vehicle.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
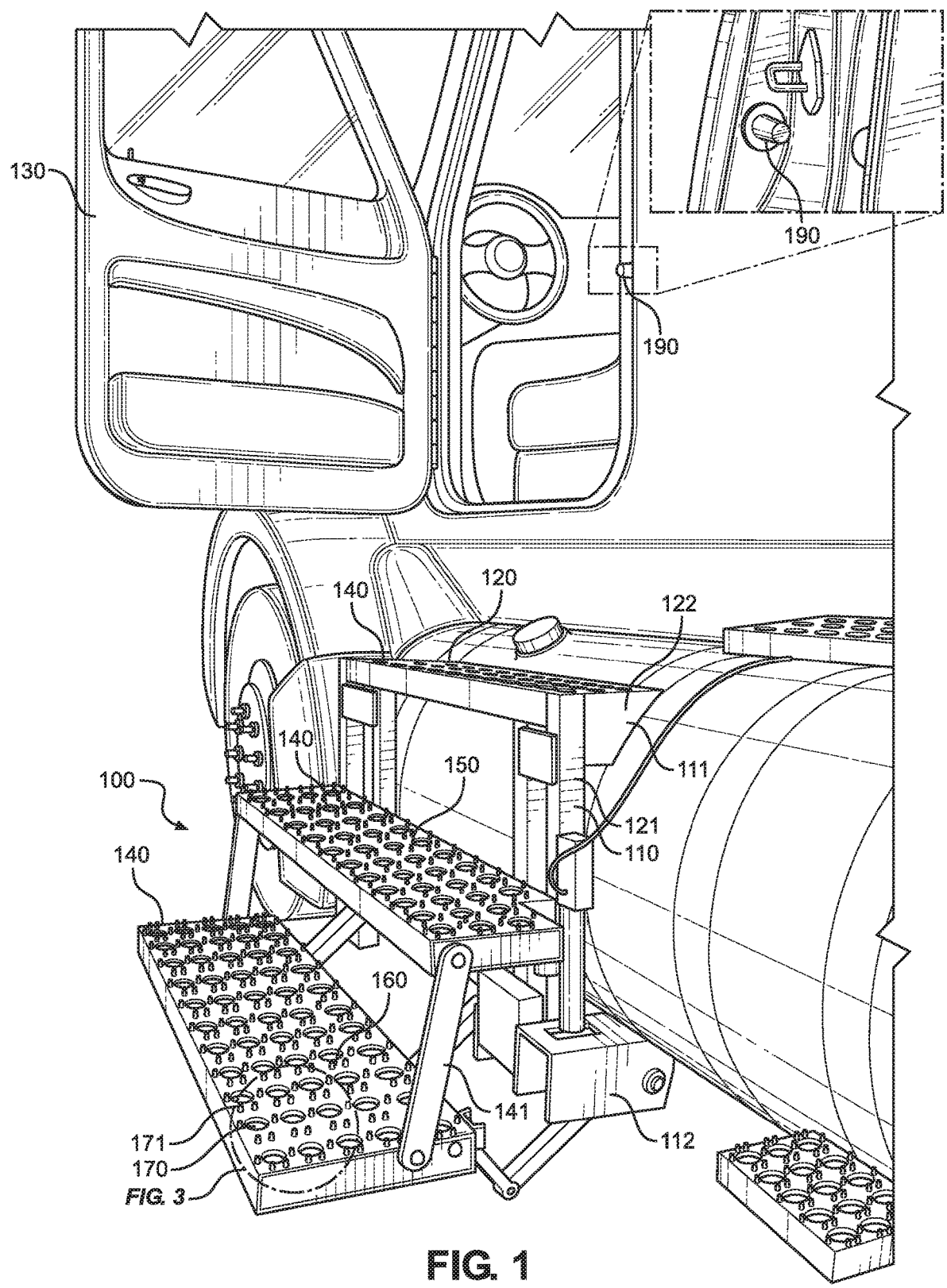
FIG. 1 shows a perspective view of an embodiment of the folding staircase in a deployed configuration.

Reference is made herein to the attached drawings. Like reference numerals are used throughout the drawings to depict like or similar elements of the folding staircase. For the purposes of presenting a brief and clear description of the present invention, a preferred embodiment will be discussed as used for the folding staircase. The figures are intended for representative purposes only and should not be considered to be limiting in any respect.

Referring now to FIG. 1, there is shown a perspective view of an embodiment of the folding staircase in a deployed configuration. The folding staircase 100 comprises a frame 110 having an upper end 111 and a lower end 112. In the shown embodiment, the frame 110 is composed of an aluminum material. Aluminum construction provides the benefit of a light-weight material which is durable and resistant to rust. In various other embodiments, the present invention can include any combination of suitably durable materials in its construction.

The upper end 111 of the frame 110 defines an upper step 120. In the shown embodiment, the upper step 120 is planar and is disposed just below the semi-tractor cab door. In various embodiments, the upper step 120 is static or fixed, and does not fold. In the shown embodiment, the frame 110 further comprises a pair of vertical members 121 disposed on opposing ends of the upper step, which provides for points of attachment for a plurality of lower steps, as well as stability for the frame 110. The frame 110 includes brackets 122 that secure to existing mounting points of a vehicle. In the shown embodiment, the brackets 122 are incorporated into the upper step 120 as a pair of upper step horizontal supports that extend orthogonally from an inner edge of the upper step 120 and contacts the portion of the vehicle below the door 130 for added stability and support. In some embodiments, the brackets 122 include a curved profile in order to make flush contact with the body of the vehicle, thereby providing greater stability and support.

A plurality of steps 140 are pivotally connected to the lower end 112 of the frame 110. In one embodiment, the plurality of steps 140 consists of an upper step 120, a middle step 150 and a bottom step 160. In one embodiment, one of the plurality of steps 140 is pivotally connected to the lower end 112 of the frame 110 and the remainder of the plurality of steps 140 are pivotally connected to each other. In a further embodiment, a plurality of pivoting arms 141 connect each of the plurality of steps 140 to each other. For example, in the shown embodiment, a middle step 150 is pivotally connected to the lower end 112 of the frame 110. Further, in the shown embodiment, a bottom step 160 is pivotally connected to the middle step 150 via a pair of pivoting arms 141. The pair of pivoting arms 141 connect an outer edge of the middle step to an outer edge of the bottom step.

Figure 3:
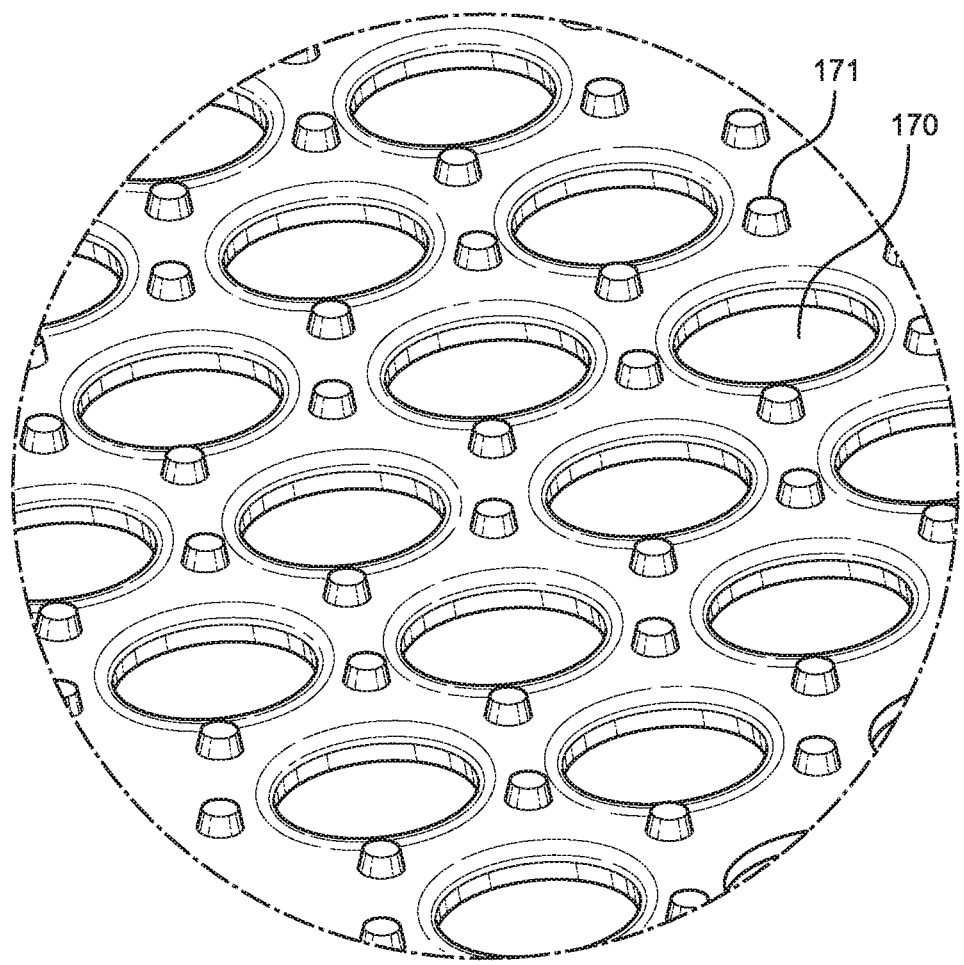
FIG. 3 shows a close-up view of the surface of a step in an embodiment of the folding staircase.

Referring now to FIGS. 1 and 3, there are shown a perspective view of an embodiment of the folding staircase in a deployed configuration and a close-up view of the surface of a step in an embodiment of the folding staircase, respectively. In various embodiments, the upper step 120, the middle step 150, and the bottom step 160 further comprise an anti-slip material. In some embodiments, such a material includes layers of plastic or rubber used to prevent unwanted slippage or movement of objects such as the shoes of an individual as they traverse the step. In various embodiments the anti-slip material is patterned to create a gripped surface and allow drainage of liquids such as rain. In the shown embodiment, the upper step 120, the middle step 150, and the bottom step 160 comprise a plurality of apertures 170. These apertures 170 provide the benefit of a non-slip surface which reduces the probability of accidents as well providing drainage for the steps such that water and ice do not accumulate thereon. Additionally, in the shown embodiment, the upper step 120, the middle step 150, and the bottom step 160 comprise a plurality of raised portions 171. These raised portions 171 also provide the benefit of a gripping surface of the steps which also reduces the probability of slippage and accidents as a result.

Figure 2:
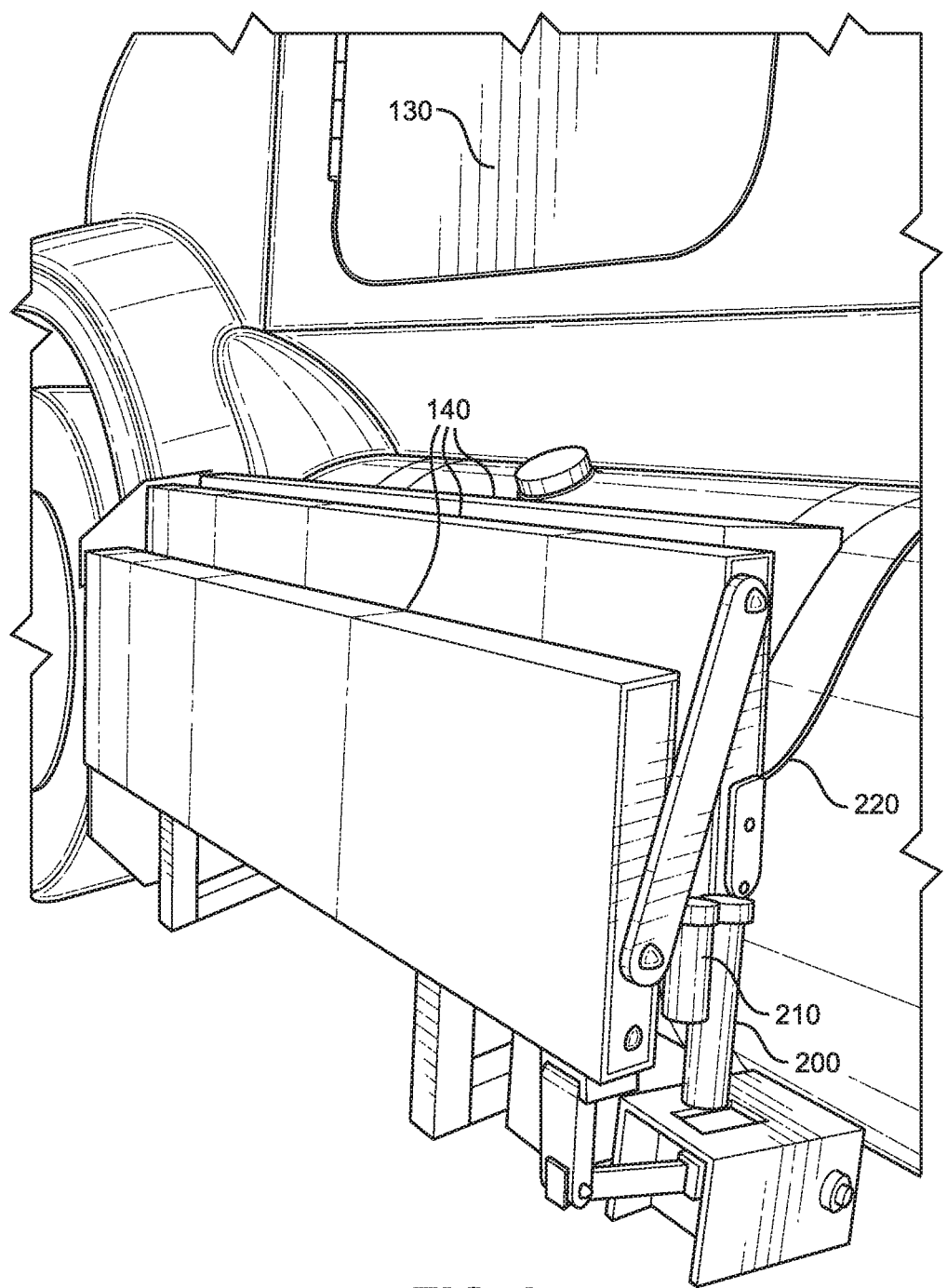
FIG. 2 shows a perspective view of an embodiment of the folding staircase in a storage configuration.

Referring now to FIG. 2, there is shown a perspective view of an embodiment of the folding staircase in a storage configuration. At least one of the plurality of steps 140 is operably connected to at least one linear actuator 200. In one embodiment, the linear actuator 200 comprises a piston. In a further embodiment, the piston comprises a threaded cylinder. The linear actuator 200 is connected to a motor 210. In the shown embodiment, the linear actuator 200 and the motor 210 is encapsulated in one unit. The motor 210 is configured to extend and retract the piston in a planar fashion. In the shown embodiment, the linear actuator 200 is oriented in a vertical position such that the piston will move up and down upon activation of the motor 210. In one embodiment, a power source 220 is in operable communication with the motor 210. In a further embodiment, the power source 220 is an existing power source of the vehicle, such as the vehicle's electrical system.

As the at least one of the plurality of steps 140 is operably connected to the linear actuator 200, when the piston moves, the at least one of the plurality of steps 140 moves. As the plurality of steps 140 are pivotally connected to each other, when one of the plurality of steps 140 moves, the remainder of the plurality of steps 140 also move. In the shown embodiment, the linear actuator 200 and the plurality of steps 140 are oriented such that upon extension of the piston, the plurality of steps 140 are moved from a horizontal orientation to a vertical orientation. In such a manner, the plurality of steps 140 are moved from a horizontal, deployed configuration, to a vertical, storage configuration.

In some embodiments, the motor 210 is operably connected to a control switch (as seen in FIG. 1, 190). In the embodiment shown in FIG. 1, the control switch is disposed in a door frame such that when the door is closed, the control switch is depressed, and when the door is open the door switch is extended. In other embodiments, the motor 210 is operably connected to a sensor. The control switch and sensor are configured to detect when a vehicle's door is open or closed. When the vehicle's door is closed, the control switch or sensor actuates the motor, thereby causing the plurality of steps 140 to move to the storage configuration. When the vehicle's door is open, the control switch or sensor actuates the motor in a reverse direction, thereby causing the plurality of steps 140 to move to the deployed configuration. One of ordinary skill in the art will understand how a sensor or switch may be utilized to extend or retract the piston of the linear actuator 200, thereby folding or unfolding the plurality of steps 140.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A folding staircase, comprising:
a frame having an upper end and a lower end;
the upper end of the frame defines an upper step;
the frame further includes a pair of vertical members, wherein the pair of vertical members remain fixed in the vertical position wherein the pair of vertical members are disposed on opposing ends of the upper step and extend downwardly towards the lower end;
a plurality of steps pivotally connected to the lower end of the frame;
a plurality of pivoting arms connecting each of the plurality of steps to each other;
the frame including a pair of brackets that secure to existing mounting points of a vehicle;
the pair of brackets are disposed on opposing ends of the upper step;
at least one of the plurality of steps operably connected to at least one linear actuator;
the linear actuator connected to a motor, wherein a power source in operable communication with the motor;
the motor operably connected to a control switch, wherein the control switch is disposed in a door frame of the vehicle;

wherein actuation of the control switch operates the motor causing the plurality of steps to unfold outwardly, thereby defining a deployed configuration; and wherein de-actuation of the control switch operates the motor causing the plurality of steps to fold inwardly, thereby defining a storage configuration.

2. The folding staircase of claim 1, wherein a top surface of the plurality of steps further comprise an anti-slip material.

3. The folding staircase of claim 2, wherein the anti-slip material disposed on the top surface of the plurality of steps comprise a plurality of raised portions.

4. The folding staircase of claim 2, wherein the anti-slip material disposed on the top surface of the top surface of the plurality of steps comprise a plurality of apertures.

5. The folding staircase of claim 1, wherein the power source is an existing power source of the vehicle.

6. A folding staircase, comprising:
a frame having an upper end and a lower end;
the upper end of the frame defines an upper step;
the frame further includes a pair of vertical members, wherein the pair of vertical members remain fixed in the vertical position wherein the pair of vertical members are disposed on opposing ends of the upper step and extend downwardly towards the lower end;
a middle step pivotally connected to the lower end of the frame;
a bottom step pivotally connected to the middle step via a pair of pivoting arms;
the pair of pivoting arms connect an outer edge of the middle step to an outer edge of the bottom step;
the frame including a pair of brackets that secure to existing mounting points of a vehicle;
the pair of brackets are disposed on opposing ends of the upper step;
the bottom step operably connected to at least one linear actuator;
the linear actuator connected to a motor, wherein a power source in operable communication with the motor;
the motor operably connected to a control switch, wherein the control switch is disposed in a door frame of the vehicle;
wherein actuation of the control switch operates the motor causing the middle step and the bottom step to unfold outwardly, thereby defining a deployed configuration; and
wherein de-actuation of the control switch operates the motor causing the middle step and the bottom step to fold inwardly, thereby defining a storage configuration.

7. The folding staircase of claim 6, wherein a top surface of the top step, the middle step, and the bottom step comprises an anti-slip material.

8. The folding staircase of claim 7, wherein the anti-slip material disposed on the top surface the top step, the middle step, and the bottom step comprise a plurality of raised portions.

9. The folding staircase of claim 7, wherein the anti-slip material disposed on the top surface the top step, the middle step, and the bottom step comprise a plurality of apertures.

10. The folding staircase of claim 6, wherein the power source is an existing power source of the vehicle.

11. A folding staircase, comprising:
a frame having an upper end and a lower end;
the upper end of the frame defines an upper step;
the frame further includes a pair of vertical members, wherein the pair of vertical members remain fixed in the vertical position wherein the pair of vertical members are disposed on opposing ends of the upper step and extend downwardly towards the lower end;
a plurality of steps pivotally connected to the lower end of the frame;
a plurality of pivoting arms connecting each of the plurality of steps to each other;
the frame including a pair of brackets that secure to existing mounting points of a vehicle;
the pair of brackets are disposed on opposing ends of the upper step;
at least one of the plurality of steps operably connected to at least one linear actuator;
the linear actuator connected to a motor, wherein a power source in operable communication with the motor;
the motor operably connected to a sensor;
wherein triggering the sensor operates the motor causing the plurality of steps to unfold outwardly, thereby defining a deployed configuration; and
wherein de-actuation of the control switch operates the motor causing the plurality of steps to fold inwardly, thereby defining a storage configuration.

12. The folding staircase of claim 11, wherein a top surface of the top step, the middle step, and the bottom step comprise an anti-slip material.

13. The folding staircase of claim 12, wherein the anti-slip material disposed on the top surface the top step, the middle step, and the bottom step comprise a plurality of raised portions.

14. The folding staircase of claim 12, wherein the anti-slip material disposed on the top surface of the top step, the middle step, and the bottom step further comprise a plurality of apertures.

15. The folding staircase of claim 11, wherein the power source is an existing power source of the vehicle.

* * * * *